Nov. 10, 1925.  R. G. WOODS  1,560,929
KITCHEN UTENSIL
Filed Feb. 2, 1925
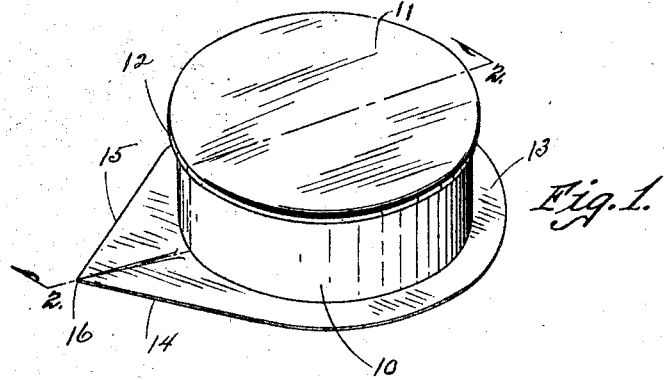
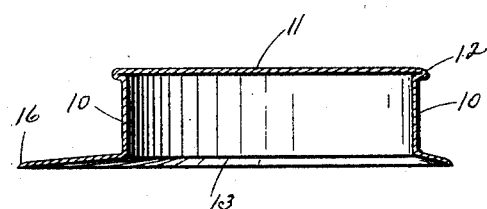
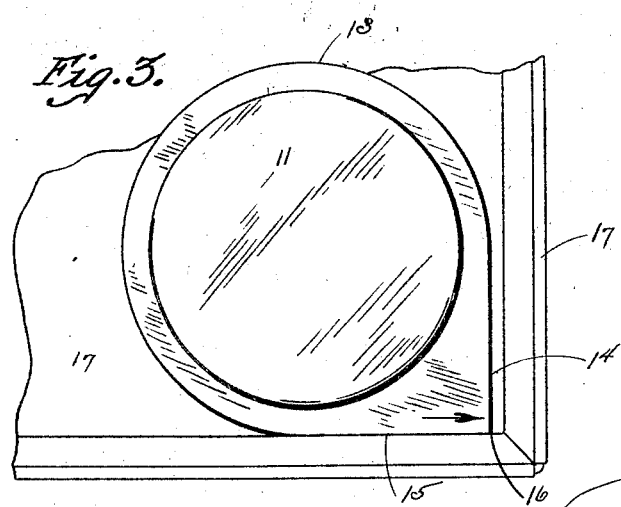
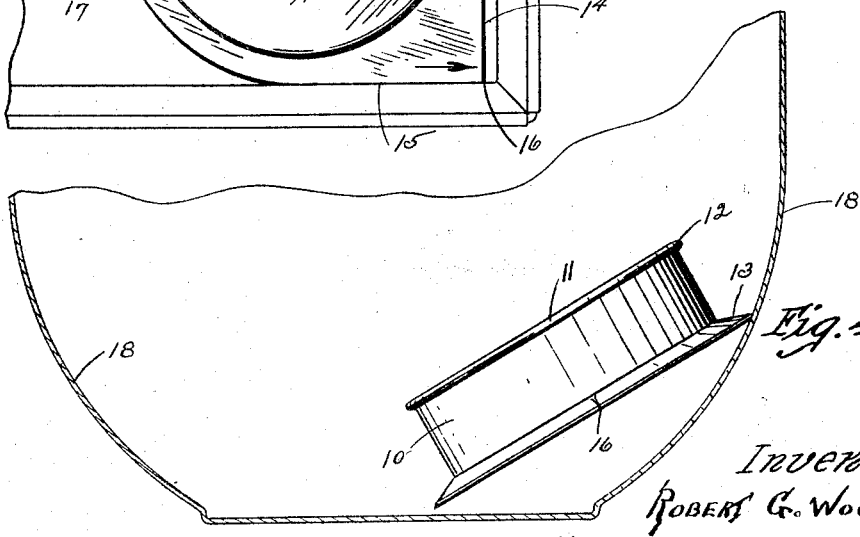
Inventor
Robert G. Woods
by Earl M. Sinclair Atty.

Patented Nov. 10, 1925.

1,560,929

UNITED STATES PATENT OFFICE.

ROBERT G. WOODS, OF NEWTON, IOWA.

KITCHEN UTENSIL.

Application filed February 2, 1925. Serial No. 6,314.

*To all whom it may concern:*

Be it known that I, ROBERT G. WOODS, a citizen of the United States of America, and resident of Newton, Jasper County, Iowa, have invented a new and useful Kitchen Utensil, of which the following is a specification.

The object of this invention is to provide a kitchen utensil adapted to scrape pans, pots, kettles, and the like.

More specifically the object of this invention is to provide a pan and pot scraper which will get into the square corners of pans for the removal of undesirable substances as well as into the various curvatures of pots.

A further object is to provide a pot and pan scraper which is easy to grasp in the hand when in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a perspective view of my complete device.

Fig. 2 is a side sectional view of my device taken on line 2—2 of Fig. 1.

Fig. 3 is a plan view of my scraper showing the instrument resting on the bottom of a square cornered pan and the position it is in when used to scrape the square corners of the pan.

Fig. 4 is another view of my scraper and showing the position it is in when used to scrape the rounded sides of a pot.

As will be noted in Fig. 2 my invention is stamped or pressed into shape from one piece of sheet metal. It may be made of any metal softer than that used in the pots and pans.

I have used the numeral 10 to designate the circular wall portion of the device. The numeral 11 designates the top or cap over the circular wall portion and preferably is so constructed as to be of greater diameter than that of the circular wall portion, thereby making the peripheral bead 12 which facilitates the grasping of the device when in use. The numeral 13 designates a peripheral flange on the bottom of the circular wall 10. This flange 13 extends outward and downward from the portion 10 and forms the scraper portion of the device. The greater portion of the edge of this peripheral flange is constructed in the form of an arc of a circle; the only exception being at 14 and 15 where it merges into two straight lines and terminates in the point 16. By this construction the sides 14 and 15 form a right angle and is to be employed extensively in cleaning and scraping out the square corners of four sided pans. The portion of the flange that is constructed in the form of an arc may be used to scrape the sides of pots that are of circular design as is illustrated in Fig. 4. It will be found that in four sided pans that if the scraper is slid along the bottom of the pan until the point 16 enters one of the corners and then lifted out of the pan in such a manner that the edges 14 and 15 engage the two walls of the pan making the corner, the bottom of the pan in this corner and the two walls forming the corner will be cleaned in this one operation. The wall 10 and the top 11 with the peripheral bead of the device affords a very suitable handle for gripping.

The slope or bevel of the cleaning flange 13 is such that it naturally assumes the proper position for scraping when placed against the wall of a pot or pan, and maintains such position regardless of the direction in which the device is moved in the cleaning operation. If desired the flange may be beveled, preferably on its lower face, to form a better cutting edge as indicated in Fig. 2, and at the same time rest flat on a surface.

Having fully described my invention what I claim and desire to obtain by Letters Patent is:

1. In a pot and pan scraper, a circular wall portion, a cap portion over said wall portion, and an outward and downwardly extending peripheral flange portion from said wall portion, said flange having a point on its periphery and so designed that the edges of said flange leading from said point extend for considerable distances in straight lines substantially at right angles to each other, said flange being beveled on its lower face.

2. In a pot and pan scraper, a circular wall portion, a cap portion over said wall portion and of greater diameter than said wall portion, and an outward and downwardly extending peripheral flange portion from said wall portion, said flange having a greater part of its rim in an arc of a circle and its remaining part terminating in a point and so designed that the edges of said flange leading from said point extend for considerable distances in straight lines at right angles and tangentially to said arc.

Signed at Des Moines, in the county of Polk and State of Iowa, this 24th day of January, 1925.

ROBERT G. WOODS.